United States Patent
Daniel et al.

(10) Patent No.: US 11,153,091 B2
(45) Date of Patent: *Oct. 19, 2021

(54) UNTRUSTED CODE DISTRIBUTION

(71) Applicant: British Telecommunications Public Limited Company, London (GB)

(72) Inventors: Joshua Daniel, London (GB); Gery Ducatel, London (GB); Mohammad Zoualfaghari, London (GB)

(73) Assignee: British Telecommunications Public Limited Company, London (GB)

( * ) Notice: Subject to any disclaimer, the term of this patent is extended or adjusted under 35 U.S.C. 154(b) by 446 days.

This patent is subject to a terminal disclaimer.

(21) Appl. No.: 16/086,074

(22) PCT Filed: Mar. 3, 2017

(86) PCT No.: PCT/EP2017/055094
§ 371 (c)(1),
(2) Date: Sep. 18, 2018

(87) PCT Pub. No.: WO2017/167549
PCT Pub. Date: Oct. 5, 2017

(65) Prior Publication Data
US 2020/0295941 A1    Sep. 17, 2020

(30) Foreign Application Priority Data

Mar. 30, 2016    (EP) .................................... 16162920

(51) Int. Cl.
*H04L 9/32*    (2006.01)
*H04L 29/06*    (2006.01)
*H04W 12/03*    (2021.01)

(52) U.S. Cl.
CPC .......... *H04L 9/3236* (2013.01); *H04L 63/123* (2013.01); *H04W 12/03* (2021.01)

(58) Field of Classification Search
CPC ............. H04L 2209/38; H04L 2209/56; H04L 9/3247; H04L 29/06571; H04L 9/3236; H04L 63/123; H04W 12/03
See application file for complete search history.

(56) References Cited

U.S. PATENT DOCUMENTS 6,192,405 B1    2/2001    Bunnell
6,535,493 B1    3/2003    Lee et al.
(Continued)

FOREIGN PATENT DOCUMENTS

EP    1919123 A1    5/2008
EP    2381363 A2    10/2011
(Continued)

OTHER PUBLICATIONS

Combined Search and Examination Report for Great Britain Application No. 1707377.6, dated Nov. 9, 2017, 9 pages.
(Continued)

*Primary Examiner* — Oleg Korsak
(74) *Attorney, Agent, or Firm* — Patterson Thuente Pedersen, P.A.

(57) ABSTRACT

A computer implemented method for code distribution by a base station to a target device via a network, the distribution being made via one or more distribution servers arranged between the base station and the target device on the network, is disclosed.

12 Claims, 4 Drawing Sheets

(56) References Cited

U.S. PATENT DOCUMENTS

| | | |
|---|---|---|
| 6,636,898 B1 | 10/2003 | Ludovici et al. |
| 7,181,768 B1 | 2/2007 | Ghosh et al. |
| 7,716,739 B1 | 5/2010 | McCorkendale |
| 7,797,748 B2 | 9/2010 | Zheng et al. |
| 7,870,153 B2 | 1/2011 | Croft et al. |
| 8,271,974 B2 | 9/2012 | Mazhar et al. |
| 8,375,437 B2 | 2/2013 | Linsley et al. |
| 8,479,294 B1 | 7/2013 | Li et al. |
| 8,516,241 B2 | 8/2013 | Chang et al. |
| 8,590,057 B1 | 11/2013 | Mayblum et al. |
| 8,661,254 B1 | 2/2014 | Sama |
| 8,739,155 B2 | 5/2014 | Hehir et al. |
| 9,009,825 B1 | 4/2015 | Chang et al. |
| 9,183,378 B2 | 11/2015 | Banerjee et al. |
| 9,235,813 B1 | 1/2016 | Qian et al. |
| 9,466,051 B1 | 10/2016 | Roth et al. |
| 9,495,668 B1 | 11/2016 | Juels et al. |
| 9,667,600 B2 * | 5/2017 | Piqueras Jover ....... H04L 9/321 |
| 9,680,640 B2 * | 6/2017 | Hughes ............. H04W 12/0401 |
| 9,693,178 B2 * | 6/2017 | Adrangi ............. H04L 63/0823 |
| 9,807,106 B2 | 10/2017 | Daniel et al. |
| 9,835,813 B1 | 12/2017 | Zhu et al. |
| 10,534,913 B2 | 1/2020 | Daniel et al. |
| 10,680,915 B2 | 6/2020 | O'Brien et al. |
| 10,945,166 B2 * | 3/2021 | Crawford ............. H04L 9/3236 |
| 10,983,781 B2 * | 4/2021 | Cecchetti ............. H04L 9/3236 |
| 2002/0100035 A1 | 7/2002 | Kenyon et al. |
| 2002/0120725 A1 | 8/2002 | Dacosta et al. |
| 2003/0084349 A1 | 5/2003 | Friedrichs et al. |
| 2003/0204644 A1 | 10/2003 | Vincent |
| 2004/0015977 A1 | 1/2004 | Benke et al. |
| 2004/0213260 A1 | 10/2004 | Leung et al. |
| 2004/0268296 A1 | 12/2004 | Kayam et al. |
| 2005/0027846 A1 | 2/2005 | Wolfe et al. |
| 2005/0091269 A1 | 4/2005 | Gerber et al. |
| 2006/0282660 A1 | 12/2006 | Varghese et al. |
| 2007/0192267 A1 | 8/2007 | Hawkins et al. |
| 2009/0254499 A1 | 10/2009 | Deyo |
| 2009/0313193 A1 | 12/2009 | Hawkins et al. |
| 2010/0011029 A1 | 1/2010 | Niemelae |
| 2010/0262873 A1 | 10/2010 | Chang et al. |
| 2011/0197070 A1 | 8/2011 | Mizrah |
| 2011/0265154 A1 | 10/2011 | Furlan et al. |
| 2011/0265164 A1 | 10/2011 | Lucovsky et al. |
| 2012/0044862 A1 | 2/2012 | Chen et al. |
| 2012/0053925 A1 | 3/2012 | Geffin et al. |
| 2012/0215727 A1 | 8/2012 | Malik et al. |
| 2012/0233678 A1 | 9/2012 | Pal |
| 2012/0246290 A1 | 9/2012 | Kagan |
| 2012/0284794 A1 | 11/2012 | Trent et al. |
| 2012/0304007 A1 | 11/2012 | Hanks et al. |
| 2012/0311526 A1 | 12/2012 | Deanna et al. |
| 2013/0006949 A1 | 1/2013 | Essawi et al. |
| 2013/0013767 A1 | 1/2013 | Stober et al. |
| 2013/0044733 A1 | 2/2013 | Jang |
| 2013/0047139 A1 | 2/2013 | Bolton et al. |
| 2014/0013319 A1 | 1/2014 | Hehir et al. |
| 2014/0067734 A1 | 3/2014 | Hawkins et al. |
| 2014/0096230 A1 | 4/2014 | Wade |
| 2014/0137244 A1 | 5/2014 | Banerjee et al. |
| 2014/0164251 A1 | 6/2014 | Loh et al. |
| 2014/0180738 A1 | 6/2014 | Phillipps et al. |
| 2014/0215490 A1 | 7/2014 | Mathur et al. |
| 2014/0298011 A1 | 10/2014 | Ganesan |
| 2014/0304825 A1 * | 10/2014 | Gianniotis .......... G06F 21/6254 726/26 |
| 2014/0344015 A1 | 11/2014 | Puértolas-Montañés et al. |
| 2014/0355564 A1 | 12/2014 | Cherian et al. |
| 2014/0358825 A1 | 12/2014 | Phillipps et al. |
| 2014/0372346 A1 | 12/2014 | Phillipps et al. |
| 2014/0380444 A1 | 12/2014 | Kelley |
| 2015/0040195 A1 | 2/2015 | Park et al. |
| 2015/0082372 A1 | 3/2015 | Kottahachchi et al. |
| 2015/0120567 A1 | 4/2015 | Van et al. |
| 2015/0127595 A1 | 5/2015 | Hawkins, II et al. |
| 2015/0128263 A1 | 5/2015 | Raugas et al. |
| 2015/0134606 A1 | 5/2015 | Magdon-Ismail et al. |
| 2015/0170112 A1 | 6/2015 | DeCastro |
| 2015/0181424 A1 | 6/2015 | Hardy |
| 2015/0206106 A1 | 7/2015 | Yago |
| 2015/0215832 A1 | 7/2015 | Fitzpatrick |
| 2015/0227741 A1 | 8/2015 | Permeh et al. |
| 2015/0244690 A1 | 8/2015 | Mossbarger |
| 2015/0271318 A1 | 9/2015 | Antos et al. |
| 2015/0332283 A1 | 11/2015 | Witchey |
| 2015/0332395 A1 | 11/2015 | Walker et al. |
| 2015/0356523 A1 | 12/2015 | Madden |
| 2015/0356555 A1 | 12/2015 | Pennanen et al. |
| 2015/0363876 A1 | 12/2015 | Ronca et al. |
| 2015/0373029 A1 | 12/2015 | Evenden et al. |
| 2015/0379423 A1 | 12/2015 | Dirac et al. |
| 2016/0027229 A1 * | 1/2016 | Spanos .................. G07C 13/00 705/51 |
| 2016/0028552 A1 * | 1/2016 | Spanos ................ H04L 9/3236 713/178 |
| 2016/0048771 A1 | 2/2016 | Chen et al. |
| 2016/0057041 A1 | 2/2016 | Gupta et al. |
| 2016/0078367 A1 | 3/2016 | Adjaoute |
| 2016/0086175 A1 | 3/2016 | Finlow-Bates et al. |
| 2016/0098730 A1 | 4/2016 | Feeney |
| 2016/0112240 A1 | 4/2016 | Sundaresan et al. |
| 2016/0112397 A1 | 4/2016 | Mankovskii |
| 2016/0142911 A1 | 5/2016 | Kreiner et al. |
| 2016/0164884 A1 | 6/2016 | Sriram et al. |
| 2016/0221186 A1 | 8/2016 | Perrone |
| 2016/0260095 A1 | 9/2016 | Ford |
| 2016/0261690 A1 * | 9/2016 | Ford .................. H04L 41/0806 |
| 2016/0275461 A1 | 9/2016 | Sprague et al. |
| 2016/0283920 A1 | 9/2016 | Fisher et al. |
| 2016/0299938 A1 | 10/2016 | Malhotra et al. |
| 2016/0321654 A1 | 11/2016 | Lesavich et al. |
| 2016/0350173 A1 | 12/2016 | Ahad |
| 2016/0357966 A1 | 12/2016 | Porat et al. |
| 2016/0364787 A1 | 12/2016 | Walker et al. |
| 2017/0031676 A1 * | 2/2017 | Cecchetti .................. G06F 8/65 |
| 2017/0063886 A1 | 3/2017 | Muddu et al. |
| 2017/0063900 A1 | 3/2017 | Muddu et al. |
| 2017/0109735 A1 | 4/2017 | Sheng et al. |
| 2017/0124534 A1 | 5/2017 | Savolainen et al. |
| 2017/0132630 A1 | 5/2017 | Castinado et al. |
| 2017/0134412 A1 | 5/2017 | Cheng et al. |
| 2017/0264428 A1 * | 9/2017 | Seger, II .................. G06F 16/13 |
| 2017/0279774 A1 | 9/2017 | Booz et al. |
| 2017/0279818 A1 | 9/2017 | Milazzo et al. |
| 2017/0286083 A1 | 10/2017 | Dimitrakos et al. |
| 2017/0286136 A1 | 10/2017 | Dimitrakos et al. |
| 2017/0302629 A1 | 10/2017 | El-Moussa et al. |
| 2018/0025166 A1 | 1/2018 | Daniel et al. |
| 2018/0144114 A1 | 5/2018 | Fiske et al. |
| 2018/0225466 A1 | 8/2018 | Ducatel et al. |
| 2018/0225469 A1 | 8/2018 | Daniel et al. |
| 2018/0225611 A1 | 8/2018 | Daniel et al. |
| 2018/0232526 A1 | 8/2018 | Reid et al. |
| 2018/0285585 A1 | 10/2018 | Daniel et al. |
| 2018/0336552 A1 | 11/2018 | Bohli et al. |
| 2019/0036895 A1 | 1/2019 | Irvine |
| 2019/0050541 A1 | 2/2019 | Wright et al. |
| 2019/0139136 A1 | 5/2019 | Molinari et al. |
| 2019/0340361 A1 * | 11/2019 | Daniel .................. H04W 12/35 |
| 2019/0354968 A1 | 11/2019 | Sato et al. |
| 2020/0073466 A1 | 3/2020 | Walsh |
| 2020/0177373 A1 | 6/2020 | Komandur et al. |
| 2020/0183757 A1 | 6/2020 | Liu |

FOREIGN PATENT DOCUMENTS

| | | |
|---|---|---|
| EP | 2101599 B1 | 9/2013 |
| EP | 2816469 A1 | 12/2014 |
| EP | 3101599 A2 | 12/2016 |
| GB | 2540976 | 2/2017 |
| GB | 2540976 A | 2/2017 |
| GB | 2540977 | 2/2017 |
| GB | 2540977 A | 2/2017 |
| WO | WO-0184285 A2 | 11/2001 |

(56) References Cited

FOREIGN PATENT DOCUMENTS

| | | |
|---|---|---|
| WO | WO-2008124560 A1 | 10/2008 |
| WO | WO-2012117253 A1 | 9/2012 |
| WO | WO-2013172750 A1 | 11/2013 |
| WO | WO-2015128612 A1 | 9/2015 |
| WO | WO-2015179020 A2 * | 11/2015 ............... H04L 9/32 |
| WO | WO-2016034496 A1 | 3/2016 |
| WO | WO-2016077127 A1 | 5/2016 |
| WO | WO-2016128491 A1 | 8/2016 |
| WO | WO-2016191639 A1 | 12/2016 |
| WO | WO-2017021153 A1 | 2/2017 |
| WO | WO-2017021154 A1 | 2/2017 |
| WO | WO-2017021155 A1 | 2/2017 |
| WO | WO-2017054985 A1 | 4/2017 |
| WO | WO-2017167547 A1 | 10/2017 |
| WO | WO-2017167548 A1 | 10/2017 |
| WO | WO-2017167549 A1 | 10/2017 |
| WO | WO-2017167550 A1 | 10/2017 |
| WO | WO-2017184160 A1 | 10/2017 |
| WO | WO-2018178026 | 10/2018 |
| WO | WO-2018178034 | 10/2018 |
| WO | WO-2018178035 | 10/2018 |
| WO | WO-2018206374 | 11/2018 |
| WO | WO-2018206405 | 11/2018 |
| WO | WO-2018206406 | 11/2018 |
| WO | WO-2018206407 | 11/2018 |
| WO | WO-2018206408 | 11/2018 |
| WO | WO2018228950 | 12/2018 |
| WO | WO2018228951 | 12/2018 |
| WO | WO2018228952 | 12/2018 |
| WO | WO2018228973 | 12/2018 |
| WO | WO2018228974 | 12/2018 |

OTHER PUBLICATIONS

Combined Search and Examination Report for Great Britain Application No. 1707379.2, dated Nov. 9, 2017, 9 pages.
International Preliminary Report for Application No. PCT/EP2018/061261, dated Nov. 21, 2019, 8 pages.
International Search Report and Written Opinion for Application No. PCT/EP2018/061405, dated Jun. 20, 2018, 12 pages.
International Search Report and Written Opinion for Application No. PCT/EP2018/061406, dated Jun. 20, 2018, 13 pages.
Adler M., "Threat Intelligence Visibility—the way forward," BT, 2015, available from www.globalservices.bt.com/uk/en/products/assure threat_ monitoring, 8 pages.
Bakshi, et al., "Securing Cloud from DDOS Attacks Using Intrusion Detection System in Virtual Machine," IEEE, 2010, 5 pages.
Bellifemine, et al., "JADE: A Software Framework for Developing Multi-Agent Applications. Lessons Learned," Elsevier, 2007, 12 pages.
Bitcoin Developer Guide, "Transactions," Retrieved from https://github.com/bitcoin-dot-org.bitcoin.org.bitcoin.org/blob/64e4c549bc5fae480e2f400c052686fd34c8fae/_includes/devdoc/guide_transactions.md, 2017, 10 pages.
Combined search and Examination Report under Sections 17 and 18(3) for Great Britain Application No. 1707376.8, dated Nov. 9, 2017, 8 pages.
Combined search and Examination Report under Sections 17 and 18(3) for Great Britain Application No. 1707378.4, dated Nov. 9, 2017, 11 pages.
European Search Report for Application No. EP17164006.3, dated Jun. 29, 2017, 6 pages.
Extended European Search Report for Application No. 17170020.6, dated Nov. 10, 2017, 8 pages.
Extended European Search Report for Application No. 17170022.2, dated Nov. 16, 2017, 8 pages.
Extended European Search Report for Application No. 17170024.8, dated Nov. 10, 2017, 10 pages.
International Preliminary Report on Patentability for Application No. PCT/EP2015/069670, dated Mar. 16, 2017, 7 pages.
International Preliminary Report on Patentability for Application No. PCT/EP2015/069673, dated Mar. 16, 2017, 9 pages.
International Preliminary Report on Patentability for Application No. PCT/EP2016/052865, dated Aug. 24, 2017, 9 pages.
International Preliminary Report on Patentability for Application No. PCT/EP2017/055081, dated Oct. 11, 2018, 9 pages.
International Preliminary Report on Patentability for Application No. PCT/EP2017/055082, dated Oct. 11, 2018, 8 pages.
International Preliminary Report on Patentability for Application No. PCT/EP2018/057674, dated Oct. 10, 2019, 8 pages.
International Preliminary Report on Patentability for Application No. PCT/EP2018/057685, dated Oct. 10, 2019, 9 pages.
International Preliminary Report on Patentability for Application No. PCT/EP2018/057686, dated Oct. 10, 2019, 8 pages.
International Preliminary Report on Patentability for Application No. PCT/EP2018/061405, dated Nov. 21, 2019, 7 pages.
International Preliminary Report on Patentability for Application No. PCT/EP2018/061406, dated Nov. 21, 2019, 8 pages.
International Preliminary Report on Patentability for Application No. PCT/EP2018/061407, dated Nov. 21, 2019, 8 pages.
International Preliminary Report on Patentability for Application No. PCT/EP2018/061408, dated Nov. 21, 2019, 10 pages.
International Search Report and Written Opinion for Application No. PCT/EP2015/069670, dated Nov. 11, 2015, 8 pages.
International Search Report and Written Opinion for Application No. PCT/EP2015/069673, dated Nov. 12, 2015, 10 pages.
International Search Report and Written Opinion for Application No. PCT/EP2016/052865, dated Mar. 17, 2016, 11 pages.
International Search Report and Written Opinion for Application No. PCT/EP2017/055081, dated Apr. 7, 2017, 11 pages.
International Search Report and Written Opinion for Application No. PCT/EP2017/055082, dated Apr. 26, 2017, 9 pages.
International Search Report and Written Opinion for Application No. PCT/EP2018/057674, dated May 2, 2018, 10 pages.
International Search Report and Written Opinion for Application No. PCT/EP2018/057685, dated Jun. 1, 2018, 9 pages.
International Search Report and Written Opinion for Application No. PCT/EP2018/057686, dated Apr. 20, 2018, 10 pages.
International Search Report and Written Opinion for Application No. PCT/EP2018/061261, dated Jun. 20, 2018, 13 pages.
International Search Report and Written Opinion for Application No. PCT/EP2018/061407, dated Jun. 20, 2018, 13 pages.
International Search Report and Written Opinion for Application No. PCT/EP2018/061408, dated Jun. 20, 2018, 15 pages.
Jin, et al., "A Guest-Transparent File Integrity Monitoring Method in Virtualization Environment," Elsevier, 2010, 11 pages.
Patel H, "A block chain based decentralized exchange," International Association for Cryptologic Research, XP061017563, Dec. 18, 2014, vol. 20141225:065012, 9 pages.
Search Report dated Nov. 8, 2017 for Great Britain Application No. GB1707381.8, 7 pages.
Wu J., et al., "Hierarchical Temporal Memory Method for Time-Series-Based Anomaly Detection," 2016, IEEE, 16th International Conference Data Mining Workshops, XP033055893, Dec. 12, 2016, pp. 1167-1172.
Zambonelli, et al., "Agent-Oriented Software Engineering for Internet Applications," Coordination of Internet Agents: Models, Technologies, and Applications, Chapter-13, Springer, 2000, 21 pages.
Zupan B., et al., "Machine Learning by Function Decomposition," ICML 1997, Retrieved from https://citeseerxist.psu.edu/viewdoc/download?doi=10.1.1.29.4455&rep=repl&type=pdf on Oct. 17, 2017, 9 pages.
Application and Filing Receipt for U.S. Appl. No. 15/548,654, filed Aug. 3, 2017, Inventor(s): Daniel et al.
Application and Filing Receipt for U.S. Appl. No. 16/498,827, filed Sep. 27, 2019, Inventor(s): Daniel et al.
Application and Filing Receipt for U.S. Appl. No. 16/498,880, filed Sep. 27, 2019, Inventor(s): Daniel et al.
Application and Filing Receipt for U.S. Appl. No. 16/498,932, filed Sep. 27, 2019, Inventor(s): Daniel et al.
Application and Filing Receipt for U.S. Appl. No. 16/611,682, filed Nov. 7, 2019, Inventor(s): Ghanea-Hercock.

(56) References Cited

OTHER PUBLICATIONS

Application and Filing Receipt for U.S. Appl. No. 16/611,686, filed Nov. 7, 2019, Inventor(s): Ghanea-Hercock.
Application and Filing Receipt for U.S. Appl. No. 16/611,694, filed Nov. 7, 2019, Inventor(s): Ghanea-Hercock.
Application and Filing Receipt for U.S. Appl. No. 16/611,701, filed Nov. 7, 2019, Inventor(s): Ghanea-Hercock.
Application and Filing Receipt for U.S. Appl. No. 16/611,707, filed Nov. 7, 2019, Inventor(s): Ghanea-Hercock.
Andreas M. Antonopoulos, "Mastering Bitcoin. Unlocking Digital Crypto-Currencies." O'Reilly Media, Apr. 2014, 282 pages.
Roger Piqueras Jover et al., "dHSS—distributed Peer-to-Peer implementation of the LTE HSS based on the bitcoin/namecoin architecture," 2016 IEEE International Conference on Communications Workshops (ICC), IEEE, May 23, 2016, pp. 354-359, XP032919891, DOI: 10.1109/ICCW.2016.7503813.
Tomoyuki Sanda et al., "Proposal of new authentication method in Wi-Fi access using Bitcoin 2.0," 2016 IEEE 5$^{th}$ Global Conference on Consumer Electronics, IEEE, Oct. 11, 2016, pp. 1-5, XP033032268, DOI: 10.1109/GTCCE.2016.78000479.
Deloitte, "Blockchain @ Telco How blockchain can impact the telecommunications industry and its relevance to the C-Suite Introduction to blockchain," Nov. 28, 2016, XP0555394340, Retrieved from the Internet: URL: https://www2.deloitte.com/content/dam/Deloitte/za/Documents/technology-media-telecommunications/za_TMT_Blockchain_TelCo.pdf [retrieved Jul. 27, 2017] p. 9-p. 20.
"A Next-Generation Smart Contract and Decentralized Application Platform" Ethereum White Paper, 2016, retrieved from https://github.com/ethereum/wiki/wiki/White-Paper.
Ahmad S., et al., "How Do Neurons Operate on Sparse Distributed Representations? a Mathematical Theory of Sparsity, Neurons and Active Dendrites," available from Cornell University Library (citation arXiv: 1601.00720) and https://arxiv.org/ftp/arxiv/papers/1601/1601.00720.pdf, retrieved on Mar. 28, 2018, 23 pages.
Ahmad S., et al., "Properties of Sparse Distributed Representations and their Application to Hierarchical Temporal Memory," available from Cornell University Library (citation arXiv: 1503.07469) and https://arxiv.org/ftp/arxiv/papers/1503/1503.07469.pdf, retrieved on Mar. 28, 2018, Numenta, Redwood City, CA, USA, Mar. 24, 2015, 18 pages.
Ahmad S., et al., "Real-Time Anomaly Detection for Streaming Analytics," available from Cornell University Library (citation arXiv: 1607.02480) and https://arxiv.org/pdf/1607.02480.pdf, retrieved on Mar. 28, 2018, Numenta, Inc., Redwood City, CA, USA, Jul. 8, 2016, 10 pages.
Anonymous: "Who will protect users from ethereum based malware?" Mar. 28, 2016 XP055306678, Retrieved from the Internet: URL: https://www.reddit.com/r/ethereum/comments/4ccfaa/who_will_protect_users_from_ethereum_based_malware/?st=itbp2q49&sh=d8cc4355 on Sep. 29, 2016.
Anonymous, "Can BitCoin be a better DRM? BitcoinBeginners," retrieved from https://www.reddit.com/r/BitcoinBeginners/commentsll y5yh8/can bitcoin be_a_better_drm, Feb. 17, 2014, 3 pages.
Anonymous, "Colored Coins—Bitcoin Wiki," Retrieved from https://en.bitcoin.it/w/index.php?title=ColoredCoins&oldid=57259, Jul. 7, 2015, 6 pages.
Antonopoulos A M., "Mastering Bitcoin—Unlocking Digital Crypto-Currencies," Early Release Raw & Unedited, ISBN: 978-1-449-37404-4; retrieved from: https://unglueitfiles.s3.amazonaws.com/ebf/05db7df4f31840f0a873d6ea14dcc28d.pdf, Dec. 2014, 282 pages.
Application and File History for U.S. Appl. No. 15/749,391, filed Jan. 31, 2018, Inventor: Daniel et al, 202 pages.
Application and File History for U.S. Appl. No. 15/749,289, filed Jan. 31, 2018, Inventor: Ducatel et al, 174 pages.
Application and Filing Receipt for U.S. Appl. No. 15/223,261, filed Jul. 29, 2016, Inventor: Daniel et al, 182 pages.
Application and Filing Receipt for U.S. Appl. No. 15/548,654, filed Aug. 3, 2017, Inventor: Daniel et al, 195 pages.

Assia Y., et al., "Colored Coins Whitepaper," 2015, available at docs.google.com/document/d/1AnkPcVZTCMLizw4DvsW6M8Q2JCOllzrTLuoWu2z1BE, 23 pages.
Benders J.F., "Partitioning Procedures for Solving Mixed Variables Programming Problems," 1962, vol. 4, pp. 238-252.
Billaudelle S., et al., "Porting Htm Models to the Heidelberg Neuromorphic Computing Platform," available from Cornell University Library (citation arXiv: 1505. 02142), retrieved on Mar. 28, 2018, from https://arx.iv.org/pdf/1505.02142.pdf, Kirchhoff-Institute for Physics, May 2015, 9 pages.
Biryukov A., et al., "University of Luxembourg" Jan. 19, 2016, XP055306767, Luxemburg, retrieved from URL:http://wwwfr.uni.lu/snt/news_events/speaker_s_presentations on Sep. 29, 2016, pp. 5 and 29.
Bonneau J., et al., "Research Perspectives and Challenges for Bitcoin and Cryptocurrencies," International Association for Cryptologic Research, Mar. 19, 2015, 18 pages.
Chaisiri, "Optimization of Resource Provisioning Cost in Cloud Computing," IEEE Transactions on Services Computing, Apr.-Jun. 2012, vol. 5 (2), 14 pages.
Cruz J.P., et al., "The Bitcoin Network as Platform for TransOrganizational Attribute Authentication," Web 2015, the Third International Conference on Building and Exploring Web Based Environments, XP055239598, Rome, Italy, 2015, 7 pages.
Cui, et al., "Continuous Online Sequence Learning with an Unsupervised Neural Network Model," Published in Neural Computation and available from https://www.mitpressjournals.org/doi/pdf/10.1162/NECOa_00893, retrieved on Mar. 28, 2018, Numenta Inc., Redwood City, CA, USA, Nov. 2016, vol. 28 (11), 31 pages.
Cui, et al., "The HTM Spatial Pooler: A Neocortical Algorithm for Online Sparse Distributed Coding," available from Cold Spring Harbor Laboratory bioRxiv (citation doi.org/10.1101/085035) and https://www.biorxiv.org/content/biorxiv/early/2017/02/16/085035.full.pdf, retrieved on Mar. 28, 2018, Numenta Inc., Redwood City, CA, USA, Feb. 3, 2017, 16 pages.
Czepluch J.S., et al., "The Use of Block Chain Technology in Different Application Domains," XP055242451, retrieved from http://http://www.lollike.org/bachelor.pdf, May 20, 2015, 109 pages.
Dr Gavin Wood, "Ethereum: A Secure Decentralize Generalized Transaction Ledger," EIP-150 Revision, Retrieved from http://gavwood.com//paper.pdf, Jun. 4, 2014, 32 pages.
Extended European Search Report for Application No. EP15179440.1, dated Feb. 10, 2016, 6 pages.
Fischer A., et al., "An Introduction to Restricted Boltzmann Machines," in: Progress in Pattern Recognition, Image Analysis, Computer Vision and Applications, vol. 7441 of the series Lecture Notes in Computer Science, 2012, pp. 14-36.
Grushack J., et al., "Currency 3.0, Examining Digital Crypto Currency Markets," Union College, XP055242356, Retrieved from http://antipasto.union.edu/engineering/Archives/SeniorProjects/2014/CS.2014/files/grushacj/grushacj_paper.pdf, Jun. 2014, 44 pages.
Hawkins, et al., in "On Intelligence, How a New Understanding of the Brain Will Lead to the Creation of Truly Intelligent Machines," Times Books, ISBN 0-8050-7 456-2, 2004, 174 pages.
Hawkins, et al., "Why Neurons Have Thousands of Synapses, a Theory of Sequence Memory in Neocortex," Published in Frontiers in Neural Circuits (10 (2016) 1-13, doi:10.3389/fncir.2016.00023) and available from https://www.frontiersin.org/articlesll0.3389/fncir.2016.00023/full, retrieved on Mar. 28, 2018, Numenta Inc., Redwood City, CA, USA, Mar. 30, 2016, 13 pages.
International Preliminary Report on Patentability for Application No. PCT/EP2017/055090, dated Oct. 11, 2018, 10 pages.
International Preliminary Report on Patentability for Application No. PCT/EP2017/055091, dated Oct. 11, 2018, 9 pages.
International Search Report and Written Opinion for Application No. PCT/EP2016/067309, dated Nov. 3, 2016, 9 pages.
International Search Report and Written Opinion for Application No. PCT/EP2016/067310, dated Sep. 22, 2016, 9 pages.
International Search Report and Written Opinion for Application No. PCT/EP2017/055090, dated Jun. 14, 2017, 12 pages.
International Search Report and Written Opinion for Application No. PCT/EP2017/055091, dated Apr. 11, 2017, 11 pages.

(56) References Cited

OTHER PUBLICATIONS

International Search Report and Written Opinion for Application No. PCT/EP2017/055095, dated Apr. 11, 2017, 10 pages.
International Preliminary Report on Patentability for Application No. PCT/EP2017/055095, dated Oct. 11, 2018, 8 pages.
Lavin, et al., "Evaluating Real-time Anomaly Detection Algorithms, the Numenta Anomaly Benchmark," available from Cornell University Library (citation archive:1510.03336) https://arxiv.org/ftp/arxiv/papers/1510/1510.03336.pdf, retrieved on Mar. 28, 2018, Numenta, Inc., Redwood City, CA, USA, Oct. 9, 2015, 8 pages.
Miller A., "The State-of-the-Art of Smart Contracts" Jan. 19, 2016, XP055306766, Luxemburg retrieved from the Internet: URL: http://wwwfr.uni.lu/snt/news_events/speaker_s_presentations on Sep. 29, 2016, pp. 7-8, 16 and 18.
Numenta, "Biological and Machine Intelligence (BAMI), a living book that documents Hierarchical Temporal Memory (HTM)," Numenta, Inc., Mar. 8, 2017, retrieved on Mar. 28, 2018 from https://numenta.com/assets/pdf/biological-and-machine-intelligence/BAMIComplete.pdf, 69 pages.
Numenta, "Hierarchical Temporal Memory including HTM Cortical Learning Algorithms," Version 0.2.1, Numenta, Sep. 12, 2011, 68 pages.
Numenta, "Sparse Distributed Representations," (Numenta, available from https://numenta.com/assets/pdf/biological-and-machine-intelligence/BaMISDR.pdf and accessed on Mar. 29, 2017, retrieved on Mar. 28, 2018, 15 pages.
Olshausen, et al., "Sparse Coding with an Overcomplete Basis Set, a Strategy Employed by VI?," Olshausen, B.A., Field, D.J., 1997, Vision Research, 37:3311-3325) retrieved on Mar. 28, 2018 from http://www.chaos.gwdg.de/michael/CNScourse_2004/papersmax/OlshausenField1997.pdf, Dec. 24, 1996, 15 pages.
Plohmann D., et al., "Case study of the Miner Botnet", Cyber Conflict (CYCON), 2012 4th International Conference on Jun. 5, 2012, pp. 1-16.
International Search Report and Written Opinion for PCT Application No. PCT/EP2016/067308, dated Sep. 21, 2016, 8 pages.
Shah S.Y., et al., "Price Based Routing for Event Driven Prioritized Traffic in Wireless Sensor Networks," Apr. 29-May 1, 2013, IEEE 2nd Network Science Workshop, XP032487185, 8 pages.
Purdy S., "Encoding Data for HTM Systems," Available from Cornell University Library (citation arXiv: 1602.05925), retrieved on Mar. 28, 2018 from https://arxiv.org/ftp/arxiv/papers/1602/1602.05925.pdf, Numenta, Inc., Redwood City, California, USA, Feb. 2016, 11 pages.
Rosenfeld M., "Overview of Colored Coins," https:1/bravenewcoin.com/assets/Whitepapers/Overview-of-Colored-Coins.pdf, Dec. 4, 2012, 13 pages.
Sood A.K., et al., "An Empirical Study of HTTP-based Financial Botnets," IEEE Transactions on Dependable and Secure Computing, IEEE Service Center, New York, NY, US, vol. 13 (2), Mar. 2016, pp. 236-251.
International Preliminary Report on Patentability for Application No. PCT/EP2016/067308, dated Feb. 15, 2018, 7 pages.
International Preliminary Report on Patentability for Application No. PCT/EP2016/067309, dated Feb. 15, 2018, 7 pages.
International Preliminary Report on Patentability for Application No. PCT/EP2016/067310, dated Feb. 15, 2018, 8 pages.
Asmi E.A.K., et al., "Bitcoin-Based Decentralized Carbon Emissions Trading Infrastructure Model," Systems Engineering, Mar. 2015, vol. 18 (2), Retrieved from the Internet: URL: https://www.researchgate.net/publication/268686553, 15 pages.
International Preliminary Report on Patentability for Application No. PCT/EP2017/055094, dated Oct. 11, 2018, 8 pages.
International Search Report and Written Opinion for Application No. PCT/EP2017/055094, dated May 15, 2017, 10 pages.
Tschorsch F., et al., "Bitcoin and Beyond: A Technical Survey on Decentralized Digital Currencies," International Association for Cryptologic Research, May 15, 2015, pp. 1-37.
Wang Z., "The Applications of Deep Learning on Traffic Identification," 2015.

Wikipedia, "Block chain (database)—Wikipedia, the free encyclopedia", Nov. 29, 2015, retrieved from the Internet: URL: https://en.wikipedia.org/w/index.php?title=Block_chain_(database)&oldid=692921608.
U.S. Appl. No. 16/086,058, filed Sep. 18, 2018, Inventor(s): Daniel et al.
Application as filed for U.S. Appl. No. 16/086,087, filed Sep. 18, 2018, Inventor(s): Smith et al.
Application as filed for U.S. Appl. No. 16/086,109, filed Sep. 18, 2018, Inventor(s): Daniel et al.
Application and Filing Receipt for U.S. Appl. No. 15/749,338, filed Jan. 31, 2018, Inventor(s): Daniel et al.
"5 Yahoo! Pipes alternatives that are actually better than Pipes," https://www.import.io/post/5-yahoo-pipes-alternatives-that-are-actually-better-than-pipes/ -, Jul. 9, 2015, 5 pages.
Aloul F., et al., "Two Factor Authentication Using Mobile Phones," May 2009, 5 pages.
Apple Support Communities, "How to Configure the "Per App VPN" feature in iOS 7?," Feb. 9, 2014, retrieved from: http://discussions.apple.com/thread/5318472, 5 pages.
Application and Filing Receipt for U.S. Appl. No. 15/508,209, filed Mar. 2, 2017, 259 pages, Inventor(s): Dimitrakos et al.
Azaria A., et al., "Medrec: Using Blockchain for Medical Data Access and Permission Management," in 2016 2nd International Conference on Open and Big Data (OBD), Aug. 2016, pp. 25-30.
Bakshi A., et al., "Securing Cloud from DDOS Attacks using Intrusion Detection System in Virtual Machine," IEEE, 2010, 5 pages.
Bellifemine F., et al., "JADE: A Software Framework for Developing Multi-Agent Applications. Lessons Learned," Elsevier, 2008, 12 pages.
Bengio Y., et al., "Deep learning," Nature, vol. 521, May 2015, 10 pages.
Bishop M.C., "Pattern Recognition and Machine Learning," Springer, Mar. 29, 2006, 758 pages.
Bitar N., et al., "Cloud Networking: Vpn Applicability and NV03 Gap Analysis," Internet Engineering Task Force, IETF, Standard working draft, internet Society (iSOC), Oct. 21, 2013, 60 pages.
Bradshaw., et al., "Introduction to Software Agents," AAAI Press/The MIT Press, 1997, 47 pages.
Buterin V., "Bootstrapping a Decentralized Autonomous Corporation: Part I," Sep. 20, 2013, Bitcoin Magazine (News). Retrieved on May 23, 2016, 9 pages.
Castillo A., et al., "Bitcoin: A Primer for Policymakers," Aug. 2013, Fairfax, VA: Mercatus Center, George Mason University, Oct. 22, 2013, 49 pages.
Combined Search and Examination Report under Sections 17 and 18(3) dated Nov. 7, 2017 for Great Britain Application No. 1709272.7, 8 pages.
Combined Search and Examination Report for Great Britain Application No. 1705137.6, dated Sep. 18, 2017, 5 pages.
Combined Search and Examination Report under sections 17 & 18(3) for Great Britain Application No. 1709273.5, dated Nov. 7, 2017, 8 pages.
Combined Search and Examination Report under sections 17 & 18(3) for Great Britain Application No. 1709274.3, dated Oct. 31, 2017, 8 pages.
Combined Search and Examination Report under Sections 17 and 18(3) for Great Britain Application No. 1705135.0, dated Sep. 26, 2017, 7 pages.
Combined Search and Examination Report under Sections 17 and 18(3) for Great Britain Application No. 1705174.9, dated Jul. 14, 2017, 5 pages.
Combined Search and Examination Report under Sections 17 and 18(3) for Great Britain Application No. 1709275.0, dated Dec. 1, 2017, 5 pages.
Combined Search and Examination Report under Sections 17 and 18(3) for Great Britain Application No. 1809489.6, dated Dec. 10, 2018, 8 pages.
Communication pursuant to Article 94(3) EPC for Application No. 18711986.2, dated Oct. 21, 2020, 11 pages.
Communication pursuant to Article 94(3) EPC for Application No. 18728662.0, dated Jan. 26, 2021, 6 pages.

(56) References Cited

OTHER PUBLICATIONS

Communication pursuant to Article 94(3) EPC for Application No. 18711988.8, dated Oct. 22, 2020, 11 pages.
Communication pursuant to Article 94(3) EPC for European Application No. 18728663.8, dated Jan. 26, 2021, 7 pages.
Dev, Bitcoin Mining Acceleration and Performance Quantification, IEEE, May 7, 2014, pp. 1-6.
Dill K., et al., "Nuts and Bolts: Modular AI from the Ground Up," Mar. 14-18, 2016, Game Developers Conference, 38 pages.
Dorri A., et al., "Blockchain for IoT Security and Privacy: The Case Study of a Smart Home," 2nd IEEE Percom Workshops, 2017, 7 pages.
Es-Samaali H., et al., "Blockchain-Based Access Control for Big Data," International Journal of Computer Networks and Communications Security, vol. 5 (7), Jul. 2017, pp. 137-147.
Examination Report under Section 18(3) for Great Britain Application No. 1709275.0, dated Jul. 8, 2020, 5 pages.
Extended European Search Report for Application No. 17170021.4, dated Nov. 10, 2017, 7 pages.
Extended European Search Report for Application No. 17170023.0, dated Nov. 10, 2017, 7 pages.
Extended European Search Report for Application No. 17175391.6, dated Nov. 14, 2017, 8 pages.
Extended European Search Report for Application No. 17175392.4, dated Nov. 29, 2017, 8 pages.
Extended European Search Report for Application No. 17175393.2, dated Dec. 4, 2017, 8 pages.
Extended European Search Report for Application No. 17175394.0, dated Nov. 14, 2017, 8 pages.
Extended European Search Report for Application No. 17175395.7, dated Aug. 10, 2017, 11 pages.
Extended European search report for Application no. 16162915.9, dated Oct. 10, 2016, 11 pages.
Fiore U., "Network Anomaly Detection with the Restricted Boltzmann Machine," Neurocomputing, 2013, 11 pages.
Hao et al., "Secure cloud computing with a virtualized network infrastructure," Alcatel-Lucent, http://www.usenix.org/legacy/event/hotdoud10/tech/slides/hao.pdf, 2010, 10 pages.
Hastie T., et al., "The Elements of Statistical Learning," Springer, 2003, 764 pages.
Hawkins J., et al., "Hierarchical Temporal Memory Concepts, Theory, and Terminology," Numenta Inc., 2006, 19 pages.
Hinton G.E., et al., "Reducing the Dimensionality of Data with Neural Networks," Science, vol. 313, Jul. 28, 2006, pp. 504-507.
Hochreiter S., et al., "Long short-term memory". Neural Computation. 9 (8), DOI: 10.1162/neco.1997.9.8.1735, Source: PubMed, 33 pages.
Huizinga ., et al., "Evolving neural networks that are both modular and regular: HyperNEAT plus the Connection Cost Technique," Proceedings of the Genetic and Evolutionary Computation Conference, Jul. 2014, pp. 697-704.
International Preliminary Report on Patentability, Application No. PCT/EP2018/057686, dated Oct. 1, 2019, 7 pages.
International Preliminary Report on Patentability for Application No. PCT/EP2018/065303, dated Dec. 26, 2019, 8 pages.
International Preliminary Report on Patentability for Application No. PCT/EP2018/065233, dated Dec. 26, 2019, 10 pages.
International Preliminary Report on Patentability for Application No. PCT/EP2018/065235, dated Dec. 26, 2019, 8 pages.
International Preliminary Report on Patentability for Application No. PCT/EP2018/065234, dated Dec. 26, 2019, 8 pages.
International Preliminary Report on Patentability for Application No. PCT/EP2018/065302, dated Dec. 26, 2019, 7 pages.
International Search Report and Written Opinion for Application No. PCT/EP2015/075688, dated Jan. 19, 2016, 12 pages.
International Search Report and Written Opinion for Application No. PCT/EP2018/065233, dated Jul. 10, 2018, 12 pages.
International Search Report and Written Opinion for Application No. PCT/EP2018/065235, dated Sep. 3, 2018, 9 pages.
International Search Report and Written Opinion for Application No. PCT/EP2018/065302, dated Aug. 3, 2018, 8 pages.
International Search Report and Written Opinion for Application No. PCT/EP2018/065303, dated Aug. 6, 2018, 10 pages.
International Search Report and Written Opinion for Application No. PCT/EP2018/065234, dated Sep. 3, 2018, 9 pages.
Jin H., et al., "A Guest-Transparent File Integrity Monitoring Method in Virtualization Environment," Elsevier, 2010, 11 pages.
Kaufman L.M., "Can a trusted environment provide security?" iEEE Security & Privacy, XP011300922, Jan./Feb. 2010, vol. 6 (1), p. 50-52.
Kelleher J.D., et al., "Fundamentals of Machine Learning for Predictive Data Analytics: Algorithms, Worked Examples, and Case Studies," MIT Press, 2015, 691 pages.
Limthong K., et al., "Network Traffic Anomaly Detection using Machine Learning Approaches," 2012, 4 pages.
Microsoft, "How VPN Works: Virtual Private Network (VPN)," Updated, Accessed on Feb. 9, 2014, https://technet.microsoft.com/enus/library/cc779919, Mar. 28, 2003, 18 pages.
Milton L., et al., N-Gram-Based User Behavioral Model for Continuous User Authentication, the Eighth International Conference on Emerging Security Information, Systems and Technologies, 2014, 7 pages.
Mitchell T.M., "Machine Learning," McGraw-Hill, Mar. 1, 1997, 421 pages.
Norta A., "Creation of Smart-Contracting Collaborations for Decentralized Autonomous Organizations," Aug. 18, 2015, Perspectives in Business Informatics Research, vol. 229 of the series Lecture Notes in Business Information Processing, 16 pages.
Noting of Loss of Rights Pursuant to Rule 112(1) EPC for 18728428.6, dated Aug. 21, 2020, 1 page.
Osgi, "OSGi Architecture," Jan. 13, 2016, retrieved from https://web.archive.org/web/20160113114200/https://www.osgi.org/developer/architecture/ on Oct. 3, 2019, 8 Pages.
Peter F., "Machine Learning: The Art and Science of Algorithms that Make Sense of Data," Cambridge, 2012, 416 pages.
Price R., "Digital currency Ethereum is cratering amid claims of a $50 million hack," Jun. 17, 2016, Business Insider, 12 pages.
Rojas P., "Modular Neural Networks," Springer-Verlag, 1996, see web reference: https://page.mi.fu-berlin.de/rojas/neural/chapter/K16.pdf , 16 pages.
Search Report under Section 17 for Great Britain Application No. 1709276.8, dated May 8, 2018, 4 pages.
Super User, "Use VPN Connection Only for Selected Application," Accessed on Feb. 9, 2014, http://superuser.com/questions/294008/use-vpn-connection-only-for-selected-Application, 2 pages.
Taylor M., "Sparse Distributed Representations," Numenta, 2017, 3 pages.
Thorpe S.J., "Spike Arrival Times: A Highly Efficient Coding Scheme for Neural Networks," Parallel Processing in Neural Systems and Computers, 1990, pp. 91-94.
Written Opinion for Application no. PCT/EP2018/057686, dated Oct. 4, 2018,6 pages.
Zambonelli F., et al., "Agent-Oriented Software Engineering for Internet Applications," Published as Chapter 13 in the Book, Coordination of Internet Agents: Models, Technologies, and Applications, Springer, 2000, 21 pages.

* cited by examiner

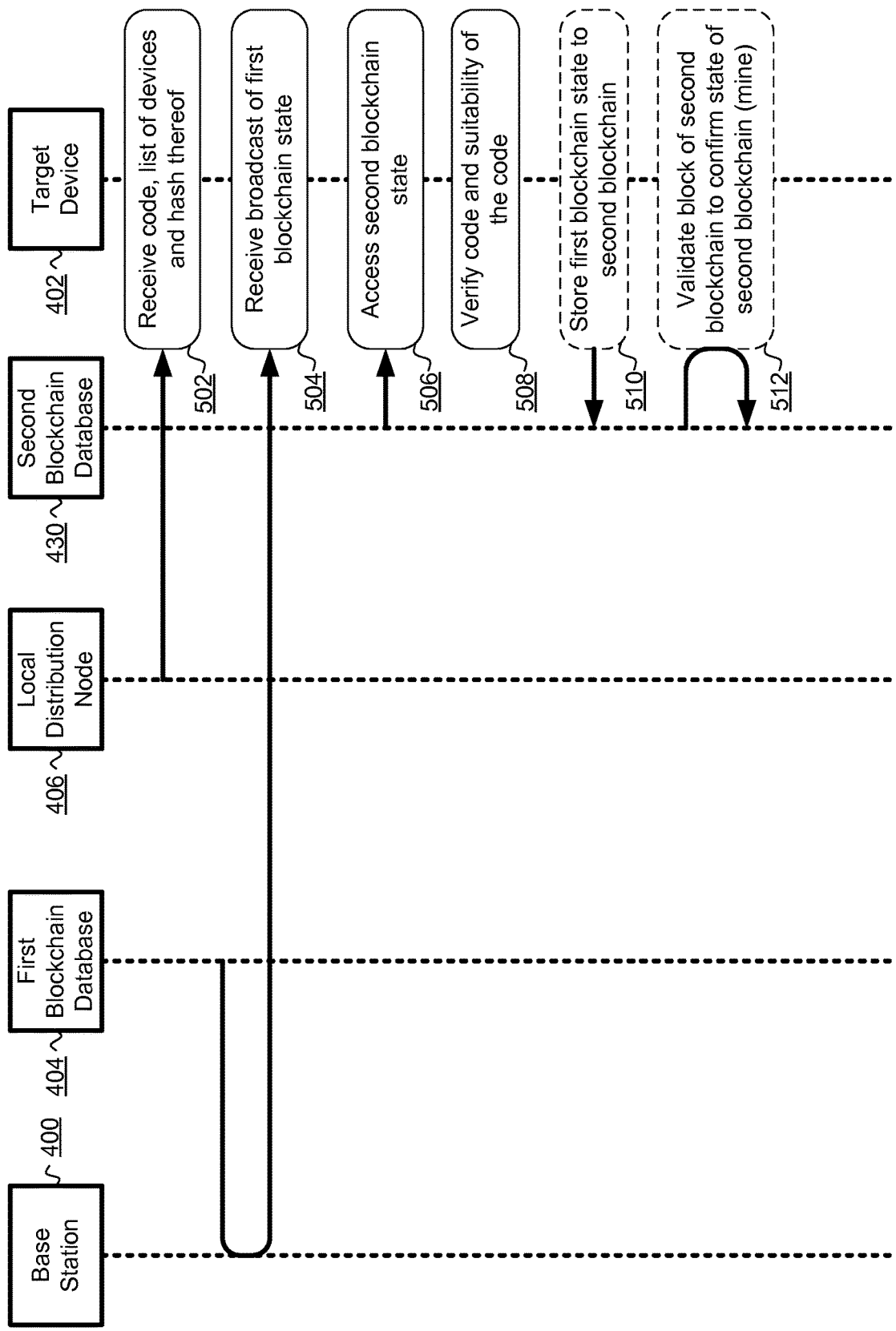

UNTRUSTED CODE DISTRIBUTION

CROSS-REFERENCE TO RELATED APPLICATION

The present application is a National Phase entry of PCT Application No. PCT/EP2017/055094, filed Mar. 3, 2017, which claims priority from EP Patent Application No. 16162920.9, filed Mar. 30, 2016 each of which is hereby fully incorporated herein by reference.

TECHNICAL FIELD

The present disclosure relates to the distribution of code to computing devices. In particular it relates to distribution of code in a trusted manner.

BACKGROUND

Devices are increasingly becoming network connected by persistent, regular, intermittent or occasional connection to computer networks or network connected servers for communication with clients, servers, each other, publication of information, data collection, data capture or other purposes. This trend has been described as developing an "internet of things" (IoT) in which devices of many potentially disparate kinds and purposes are network connected, including, inter alia: domestic appliances and equipment; utility supply and control apparatus such as energy supply and control; commercial machinery and plant; vehicles; sensors and detectors; lighting; heating; media devices including audio and video; medical devices; learning aids; timepieces; data storage devices; food preparation and storage devices; agricultural apparatus; human and animal monitoring devices; personal possessions; articles of fashion including clothing and footwear; roadside apparatus such as traffic monitors; street furniture; distributed computing or other processing devices; and many other devices and apparatus as will be apparent to those skilled in the art. The motivation for network connection of such devices can be varied including, for example: a desire to share information about a state, configuration, presence, environment, locality or arrangement of a device; communication of events, alerts, states or state changes relating to a device; for multiple devices to collaborate, coexist, cooperate, communicate or the like; to generate sensory output for subsequent consumption, recording or the like; for control of devices such as by network configuration, control, installation, modification, operation and the like; and many other purposes as will be apparent to those skilled in the art.

Notably, a network connection for any or all such devices may not be constant or persistent, in the sense that a network connection can be provided or obtained only occasionally for the purpose sending and/or receiving data. Alternatively, some devices may be network connected by proxy through a network connected other device such as a hub, server, agent or the like with such connection to the other device itself being potentially non-permanent or non-persistent. For example, some devices may be suitable for connection to a proxy or agent such as by a proximity network technology such as a Bluetooth, local wireless or short-range radio network. In such embodiments the proxy or agent may not be permanently located so as to engage in communication with all devices and may instead move or be relocated periodically or as required to communicate with devices to provide a network connection or even to receive data for transmission to the network and send data for receipt from the network by the device, such actual transmissions taking place later when such proxy or agent is itself network connected. Despite the absence of permanent and/or persistent network connections for such devices, they shall nonetheless be considered "network connected" for the purpose of the present description.

A benefit of network connection for devices is the opportunity for devices to be reprogrammed, reconfigured, adapted, supplemented, modified, updated and/or revised based on data received via the network. For example, a function of a particular network connected device can be embodied in software such as a software application for execution by the network connected device. Such software can be revised or replaced by communicating new or updated software via the network. A common example of this is a firmware for a device, updates for which can be received via a network.

Each network connected device presents a potential vulnerability to a network and other devices connected thereto which malicious agents or entities might seek to exploit for malicious purposes. For example, network connected devices can be subject to spoofing, unauthorized access, unauthorized modification and/or unauthorized use. Such network connected devices can be furnished with little processing resource (so as to reduce manufacturing and operating costs, for example) and traditional security mechanisms such as intrusion detection services, antimalware services, firewalls and antivirus services may be difficult to accommodate for or by the device without unduly impacting the limited resource of the device or other operation of the device or may simply be too costly in view of the value or cost of the device. Additionally, the nature of some network connected devices can render them unable or ill-equipped to authenticate themselves to a network or other network connected entity, such as due to limitations of resource of the device or due to the economics of providing such facilities for very large numbers of such devices. Accordingly, the nature of network connected devices and their operation can mean that communications and communicating entities are essentially untrusted and certainty in the reliability and appropriateness of received data is not assured.

Consequently, a range of challenges for network connected devices arise. For example, devices receiving executable code via a network cannot readily confirm that received code is trusted and that the code is intended for the device. While code can be hashed and/or signed such mechanisms can be vulnerable to spoofing or other threats, especially in a network subject to potential interception, intermediary insertion and the like. For example, data and an accompanying hash communicated by an originating server can be intercepted and replaced with a new valid hash. Thus hashing and signing of communications payloads can be made to look genuine and/or can be difficult for a receiving entity to verify especially where multiple intermediate distribution components are involved in a distribution network. It would therefore be advantageous to address these challenges.

SUMMARY

The present disclosure accordingly provides, in a first aspect, a computer implemented method for code distribution by a base station to a target device via a network, the distribution being made via one or more distribution servers arranged between the base station and the target device on the network, the method comprising: the base station maintaining a blockchain data structure storing one or more blocks and having a state determined by a most recently committed block in the blockchain; the base station generating a new transaction for storage in the blockchain corresponding to code for distribution by the base station to a defined list of network connected devices including the target device, the new transaction including a hash value for the code and the list of network connected devices, wherein the new transaction is stored and committed as a new block in the blockchain such that the blockchain has a new current state, the new block having associated a hash value based on the contents of the new transaction and a hash value evaluated for a block corresponding to a preceding state in the blockchain; sending the code, the defined list of devices and the hash value for the code and the defined list of devices to the target device via the one or more distribution servers; and broadcasting the current state of the blockchain for receipt by target device such that the target device is able to verify the code and the suitability of the code for the target device.

In some embodiments the blockchain data structure is a sequential transactional database accessible via the network.

In some embodiments the blockchain data structure is stored locally to the base station.

In some embodiments the base station is one of a plurality of base stations and the blockchain data structure is shared by the base stations.

In some embodiments the broadcast is achieved via the network.

In some embodiments the broadcast is achieved via a communication channel other than the network.

In some embodiments the broadcast is achieved by a wireless radio broadcast.

In some embodiments the verifying the code and the suitability of the code by the target device includes: comparing the hash values of the code and the defined list of devices with corresponding hash values in the broadcast current state of the blockchain; and verifying the current state of the blockchain with reference to a previous state of the blockchain accessible by the target device.

In some embodiments the previous state of the blockchain is accessible to the target device by way of all or part of the blockchain data structure being accessible to the target device.

In some embodiments the previous state of the blockchain is previously received and stored by the target device.

The present disclosure accordingly provides, in a second aspect, a computer system including a processor and memory storing computer program code for performing the method described above.

The present disclosure accordingly provides, in a third aspect, a computer program element comprising computer program code to, when loaded into a computer system and executed thereon, cause the computer to perform the method set out above.

BRIEF DESCRIPTION OF THE DRAWINGS

An embodiment of the present disclosure will now be described, by way of example only, with reference to the accompanying drawings, in which:

FIG. 5 is a flow diagram of a method for receiving code distributed by a base station at a target device via a network in the alternative arrangement of FIG. 4 in accordance with an embodiment of the present disclosure.

DETAILED DESCRIPTION

Figure 1:
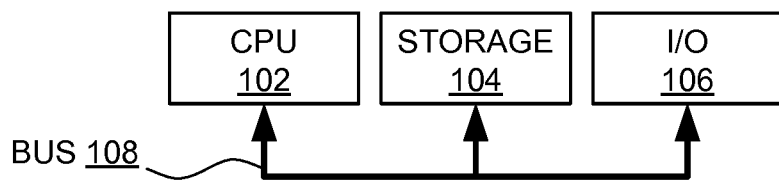
FIG. 1 is a block diagram of a computer system suitable for the operation of embodiments of the present disclosure.

FIG. 1 is a block diagram of a computer system suitable for the operation of components in embodiments of the present disclosure. A central processor unit (CPU) 102 is communicatively connected to storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
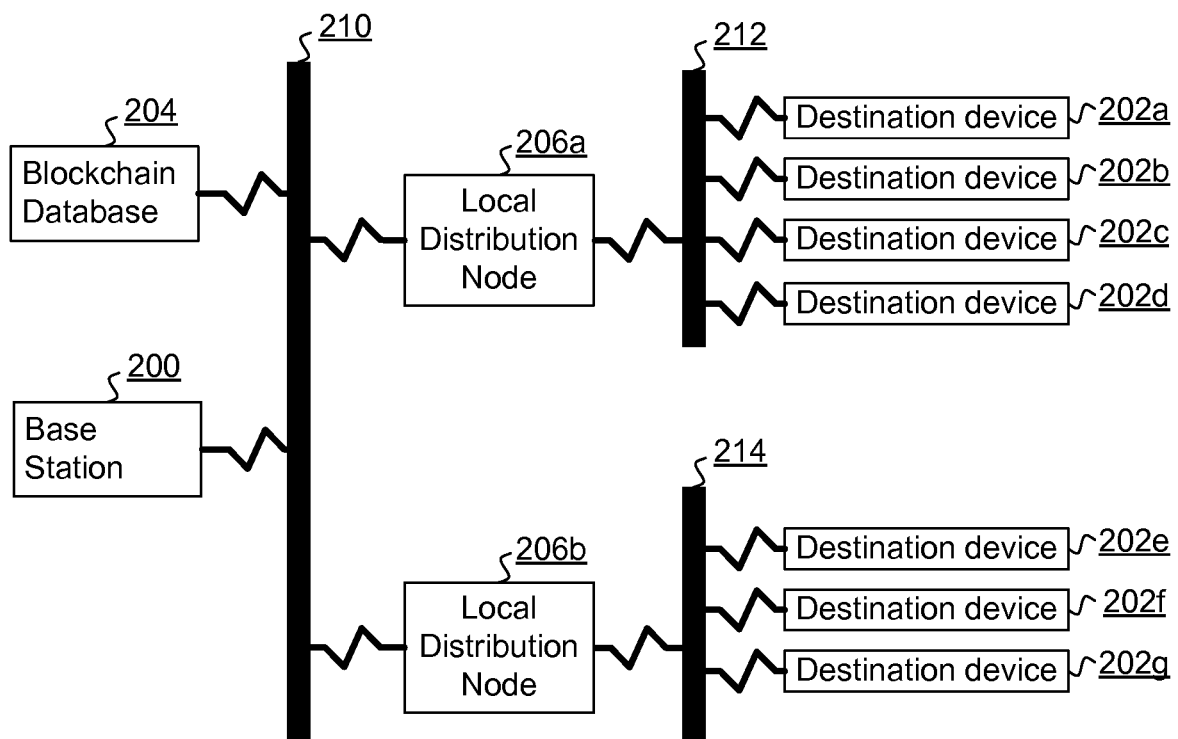
FIG. 2 is a component diagram of an arrangement for the distribution of code by a base station in accordance with an embodiment of the present disclosure.

FIG. 2 is a component diagram of an arrangement for the distribution of code by a base station 200 in accordance with an embodiment of the present disclosure. The base station 200 is a network connected entity embodied in hardware, software, firmware or a combination and constitutes a source of code for distribution to one or more destination devices 202a to 202g as target destination devices 200. The base station 200 is communicatively connected to a computer network 210 such as a wired or wireless network whether physical or virtual for the communication of data, messages, information and the like thereby. For example, the base station 200 is a network connected computer system such as a server computer system for providing software code updates, revisions, replacements or firmware updates or the like to selected destination devices 202. Such code is therefore associated with a defined list of network connected devices 202 (i.e. one or more of destination devices 202) to which the code is to be sent for execution.

The destination devices 202a to 202g are network connected devices such as computer systems, computing components, processors, hardware, software, firmware, physical or virtual devices and/or appliances. The destination devices 202 can be connected to different computer networks 212, 214 which may or may not be interconnected by any suitable network topology and may or may not be one and the same network. Furthermore, either or both of the computer networks 212, 214 to which the destination devices 202 connect may or may not be interconnected with a computer network 210 to which the base station 200 is connected and may or may not be one and the same as the computer network 210 of the base station. The destination devices 202 can be any suitable network connected devices such as devices commonly referred to as IoT devices.

While the destination devices 202 are network connected, the nature of the network connection need not necessarily be persistent, permanent or consistent. As previously described, the network connection of such devices may be intermittent, periodic and/or dependent on other devices such as agents or other entities having or providing network connection thereby, by proxy or even in a disconnected manner with network communication being achieved asynchronously via such agent entity.

The destination devices 202 receive code from one or more distribution nodes. Distribution nodes 206a, 206b are hardware, software, firmware or combination components such as computer systems for receiving code from one or more base stations 200 and distributing the code to destination devices 202. By way of example in FIG. 2, a first subset of the destination devices 202a to 202d operate in communication with a first local distribution node 206a and a second subset of the destination devices 202e to 202g operate in communication with a second local distribution node 206b. For example, each distribution node may be local to each respective subset of destination devices 202 based on locality, network location or may exhibit compatibilities in respect of architecture of one or more of the network, hardware, software, firmware or other characteristics of the destination devices 202.

The base station 200 further maintains a blockchain data structure 204 storing one or more blocks and having a state determined by a most recently committed block in the blockchain. While the blockchain 204 of FIG. 2 is illustrated as distinct and separate to the base station 200 for access by the base station 200 via the network 210, it will be appreciated by those skilled in the art that the blockchain 204 could alternatively be integrated with, local to or otherwise accessible to the base station 200.

The blockchain database 204 is a sequential transactional database that may be distributed and shared by multiple entities such as base station 200. For example, multiple base stations 200 could be provided and the blockchain 204 can be shared by multiple base stations 200. Distributed sequential transactional databases are well known in the field of cryptocurrencies and are documented, for example, in "Mastering Bitcoin. Unlocking Digital Crypto-Currencies." (Andreas M. Antonopoulos, O'Reilly Media, April 2014). For convenience, such a database is herein referred to as a blockchain 206 though it will be appreciated that other suitable databases, data structures or mechanisms possessing the characteristics essential for embodiments of the present invention could alternatively be used. Typically, a blockchain database is a distributed chain of block data structures accessed by a network of nodes, often referred to as a network of miners. Each block in a blockchain includes a one or more data structures, and in some exemplary blockchains a Merkle tree of hash or digest values for transactions included in a block are used to arrive at a hash value for a block which is itself combined with a hash value for a preceding block to generate a chain of blocks (i.e. a blockchain). A new block of one or more transactions is added to the blockchain by such miner software, hardware, firmware or combination systems in, for example, a miner network. A newly added block constitutes a current state of the blockchain. Such miners undertake validation of substantive content of transactions (such as any criteria defined therein) and adds a block of one or more new transactions to a blockchain as a new blockchain state when a challenge is satisfied as a "proof-of-work", typically such challenge involving a combination hash or digest for a prospective new block and a preceding block in the blockchain and some challenge criterion. Thus miners in a miner network may each generate prospective new blocks for addition to the blockchain. Where a miner satisfies or solves a challenge and validates the transactions in a prospective new block such new block is added to the blockchain. Accordingly, a blockchain provides a distributed mechanism for reliably verifying a data entity such as an entity constituting or representing the potential to consume a resource.

In embodiments of the present disclosure, the blockchain 204 accessed by the base station 200 can be somewhat simplified yet still provide the benefits of the present disclosure. In particular, the base station 200 can conceivably be the only entity that accesses the blockchain 204 directly to create new transactions for the blockchain 204 and to confirm transactions as new blocks in the blockchain 204. Further, each block in the blockchain 204 can conceivably consist of only a single transaction, each transaction representing a new distribution of code for selected destination devices 202. The proof-of-work requirement can be dispensed with in some embodiments of the present invention in view of the limited or exclusive access to the blockchain 204. Accordingly, in some embodiments of the present disclosure the blockchain 204 is a type of private blockchain accessed and maintained by the base station 200.

Figure 3:
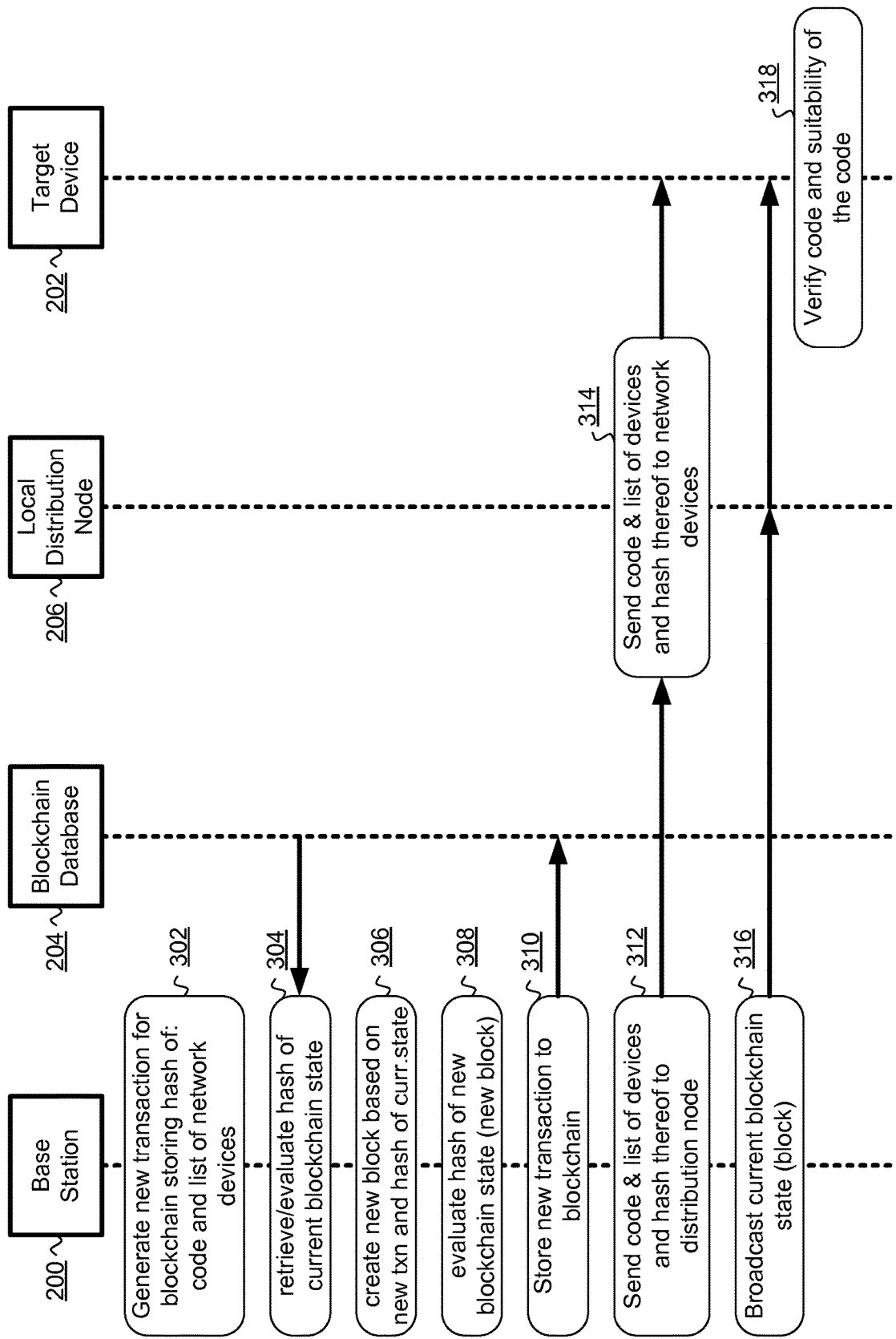
FIG. 3 is a flow diagram of a method for code distribution by a base station to a target device via a network in accordance with an embodiment of the present disclosure.

The arrangement of FIG. 2 will now be described in use for the distribution of code to a particular one of the destination devices as a target device 202 with reference to FIG. 3. The code has associated a defined list of destination devices 202 as network connected devices by which the code is to be received and executed. FIG. 3 is a flow diagram of a method for code distribution by a base station to a target device via a network in accordance with an embodiment of the present invention. Initially, at 302, the base station 200 generates a new transaction for the blockchain 204. The new transaction includes a hash value generated by a hashing function for the code and the list of defined list network devices. Subsequently, at 304, the base station 200 evaluates or retrieves a hash value for a current state of the blockchain 204 as a hash of the current state (latest block) of the blockchain 204. This can be determined from the blockchain 204 itself. At 306 the base station 200 creates new block for blockchain 204 consisting of the new transaction generated at 302 and the hash of the current state (latest block) of the blockchain 204 obtained at 304. The new block will constitute a new state of the blockchain 204. At 308 the base station 200 evaluates a hash of the new block and stores the new block, along with its hash, to the blockchain database 204 at 310.

Subsequently, at 312, the base station 200 communicates the code, list of defined network devices and the hash value thereof (i.e. the hash value of the code and list of defined network devices evaluated at 302) to one or more local distribution nodes 206. At 314 the local distribution node(s) 206 send the code, list of defined network devices and hash value thereof to a target device 202 as one of the network connected destination devices. Subsequently, at 316, the base station 200 broadcasts the current state of the blockchain 204 to all or a subset of the destination devices 202a to 202g including the target device 202. The broadcast at 316 can be achieved via one or more of the computer networks 210, 212, 214 which may, therefore, occur via the local distribution node(s) 206. Alternatively, the broadcast can be achieved by a communication channel other than one or more of the networks 210, 212, 214 such as a wireless radio broadcast or a broadcast via one or more different network(s). The effect of the broadcast is receipt, by the target device 202, of the current state 204 of the blockchain.

The target device thus receives the code, list of defined network devices and hash value thereof from the local distribution node 206. Further, the target device receives the current state of the blockchain 204 by way of the broadcast. The target devices 202 is therefore able, at 318, to verify the code in order to trust that the code originates from the base station 200 and to verify whether the code is suitable for the target device. The verification that the code and list of network devices originate from the base station 200 can be achieved by comparison of a hash of the code and list with the current blockchain state 316 that includes the hash of the code and list directly from the base station 200. On this basis, the target device 202 can verify the suitability of the code by checking the defined list of network connected devices for a reference to the target device 202. Thus, in this way target device can execute received code when it is verified to be suitable and originates from the base station 200 without a need to trust the local distribution node 206 from which the code is received. Furthermore, the distribution mechanism for code (e.g. via networks 210, 212, 214 and involving potentially multiple distribution nodes 206) is maintained and a broadcast is required only for a current state of the blockchain 204. The current state of the blockchain 204 is not sensitive information (the code and list of destination devices are not/need not be included) and is relatively small (e.g. consisting only of hash values) so it's wide broadcast is acceptable.

One remaining threat is the possibility that the blockchain status broadcast is spoofed such that a malicious entity generates a fake or manipulated blockchain status broadcast such as a broadcast seeking to confirm the validity of malicious code and/or list of destination devices. For example, a rogue or malicious entity could seek to install malware on a set of destination devices (or all destination devices) and so intercepts distribution of code by the base station 200 and distribution nodes 206 and modifies or replaces the package with malicious code and a broadly defined list of target destination devices and having correctly calculated hash values. Such a malicious entity could generate a corresponding blockchain state for broadcast to substantiate the distributed code which could be received and verified by a target device 202 and executed. One approach to address this challenge is to provide access to a preceding state of the blockchain 204 for the target device 202. Thus, where target device 202 has access to a blockchain state (i.e. a previous committed block) immediately preceding a new blockchain state received by the broadcast, the target device 202 is able to verify the new blockchain state really does belong to the blockchain 204 to succeed the previous state based on the hash value of the new blockchain state. This is possible because each subsequent block in the blockchain 204 includes the hash of the previous block and so a hash of a subsequent block is tied to the previous block so providing the secure and reliable chain of blocks. Such an approach requires that each destination device 202 has access to a preceding block which can be achieved if, for example, each device 202 is provided with an initial or other previous block and receives all subsequent blocks to update its record of a most recent block. Alternatively, the blockchain 204 can be adapted to be accessible to the destination devices 202, although such an arrangement arguable involves the additional challenge of verifying that the accessed blockchain is the authentic one. Accordingly, an alternative approach to address this challenge is considered and described below with respect to FIG. 4.

Figure 4:
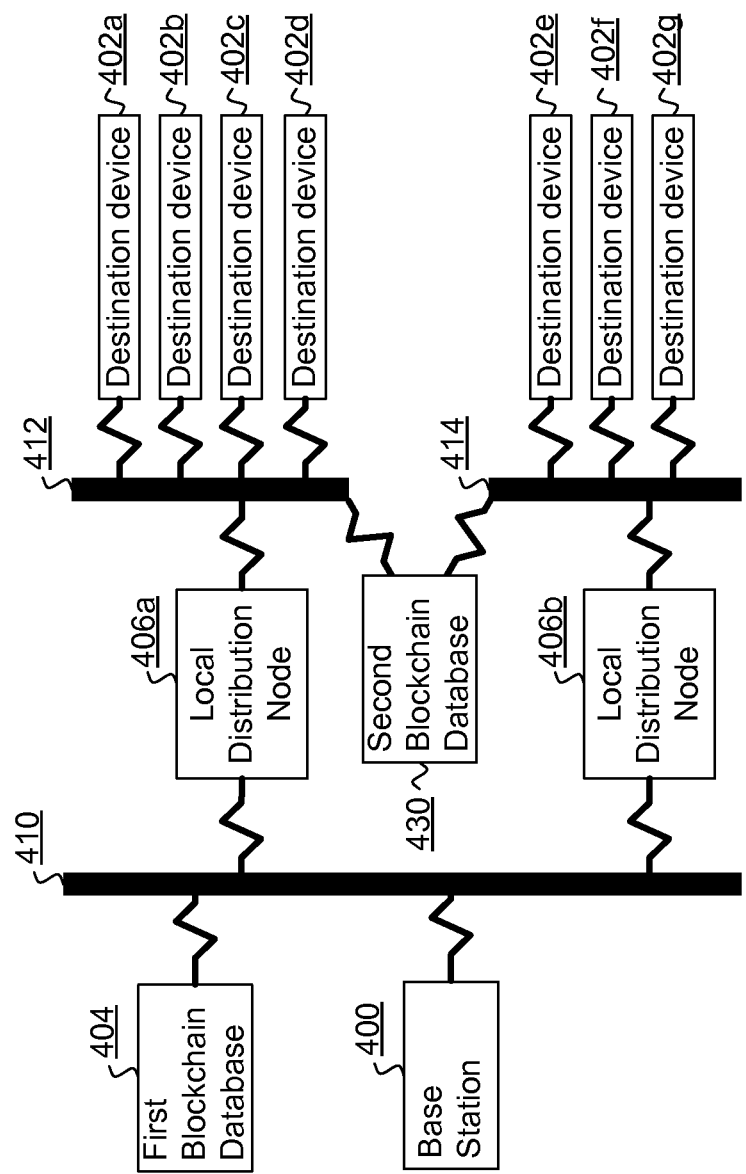
FIG. 4 is a component diagram of an alternative arrangement for the distribution of code by a base station in accordance with an embodiment of the present disclosure.

FIG. 4 is a component diagram of an alternative arrangement for the distribution of code by a base station 400 in accordance with an embodiment of the present disclosure. Many of the features of FIG. 4 are identical to those described above with respect to FIG. 2 and these will not be repeated here. In FIG. 4 the blockchain of the base station is referred to as a first blockchain 404 and the arrangement additionally includes a second blockchain database 430 as a shared blockchain 430 accessible to multiple destination devices 402. In one embodiment the second blockchain 430 is accessible to all destination devices 402 and local distribution nodes 406. The second blockchain 430 is a further sequential transactional database though the second blockchain 430 may differ from the first in some embodiments in that the second blockchain 430 is mined by miner components to validate blocks in the second blockchain 430. In this way blocks in the second blockchain 430 are verifiable by multiple or all destination devices 402 (and, in some embodiments, distribution nodes 406). The current state of the second blockchain 430 stores a most recently received state of the first blockchain 404. The current state of the second blockchain 430 is validated by multiple miners based on their received information about the first blockchain 404, such as current state information for the first blockchain 404 received by broadcast messages. Such miners may be required to perform a proof-of-work in order to commit their proposed block to the second blockchain 430 and, over time, other miners will be able to determine whether they can confirm or refute the validity of a committed block based on their own understanding of the state of the first blockchain 404. Thus the second blockchain 430 operates more as a traditional blockchain data structure for the evaluation and storage of new blocks by miners that can be confirmed by other miners to arrive, over time, at a consensus state of the second blockchain 430.

These features of the second blockchain 430 serve a useful purpose when destination devices 402 seek to determine if receive code originates from a base station 400 and the suitability of the code. A target device 402 can refer to the consensus state of the second blockchain 430 to determine a validated state of the first blockchain 404 to verify received code and list of devices before executing the code. The method of this process will now be considered in use with reference to FIG. 5.

FIG. 5 is a flow diagram of a method for receiving code distributed by a base station 400 at a target device 402 via a network in the alternative arrangement of FIG. 4 in accordance with an embodiment of the present invention. Initially, at 502, the target device receives new code, a list of network connected devices and a hash thereof from a local distribution node 406. The target device 402 need to determine if the code and list can be trusted in order to determine the suitability of the code for the target device 402. Thus, at 504 the target device 402 receives a current state of the first blockchain 404 such as from the base station 400 as a broadcast message. Such a broadcast message can be as previously described. At 506 the target device 402 accesses a state of a second blockchain 430 which stores a consensus agreed state of the first blockchain 404. The consensus agreed state stored in the second blockchain 430 may not be reliable until a period of time has passed as miners (such as other destination devices and/or distribution nodes) generate and/or confirm the current state of the second blockchain 430. Thus, in one embodiment the second blockchain 430 is used to store a preceding state of the first blockchain 404 that precedes a new state of the first blockchain 404 received at 504. In this way the need for time to allow a consensus on the preceding state of the first blockchain 404 to be agreed and committed to the second blockchain 430 can be accommodated since the second blockchain 430 is employed to store a previous state of the first blockchain.

In this way the target device 402 receives the code, the list of destination devices for the code, and sufficient reliable information to confirm (at 508) the validity and authenticity of the code and list by way of a new state of the first blockchain 404 by the broadcast and the preceding state of the first blockchain 404 by the second blockchain 430 state. The validity and authenticity is confirmed by comparing hash values as previously described. Accordingly, the target device is able to determine the reliability and suitability of the code for execution without recourse to unreliable, potentially spoofed or tampered code, lists or state of the first blockchain 404.

Subsequent to the verification at 508 the target device optionally participates as a miner for the second blockchain 430 and seeks to store the state of the first blockchain 404 received at 504 to the second blockchain 430. Such storage may additionally require a proof-of-work task, such as the achievement of a particular hash value for a proposed new block conforming to a predefined rule. Subsequently at 512 the second blockchain 430 can be validated by the target device 402 and other miners to arrive at a consensus state of the second blockchain 430.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the invention is not limited thereto and that there are many possible variations and modifications which fall within the scope of the claims.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method for distributing code to a target device for execution by the target device, the distribution being made by a base station to the target device via a network with one or more distribution servers arranged between the base station and the target device on the network, the method comprising:

the base station maintaining a blockchain data structure storing one or more blocks and having a state determined by a most recently committed block in the blockchain data structure;

the base station generating a new transaction for storage in the blockchain data structure corresponding to code for distribution by the base station to a defined list of network connected devices including the target device, the new transaction including a hash value for the code and the defined list of network connected devices, wherein the new transaction is stored and committed as a new block in the blockchain data structure such that the blockchain data structure has a new current state, the new block having associated a hash value based on contents of the new transaction and a hash value evaluated for a block corresponding to a preceding state in the blockchain data structure;

sending the code, the defined list of network connected devices, and the hash value for the code and the defined list of network connected devices to the target device via the one or more distribution servers; and broadcasting the new current state of the blockchain data structure for receipt by target device such that the target device is able to verify the code and a suitability of the code for execution by the target device.

2. The method of claim 1, wherein the blockchain data structure is a sequential transactional database accessible via the network.

3. The method of claim 1, wherein the blockchain data structure is stored locally to the base station.

4. The method of claim 1, wherein the base station is one of a plurality of base stations and the blockchain data structure is shared by the plurality of base stations.

5. The method of claim 1, wherein the broadcasting is achieved via the network.

6. The method of claim 1, wherein the broadcasting is achieved via a communication channel other than the network.

7. The method of claim 1, wherein the broadcasting is achieved by a wireless radio broadcast.

8. The method of claim 1, wherein the verifying the code and the suitability of the code by the target device includes:

comparing the hash values of the code and the defined list of network connected devices with corresponding hash values in the broadcast new current state of the blockchain data structure; and verifying the new current state of the blockchain data structure with reference to a previous state of the blockchain data structure accessible by the target device.

9. The method of claim 8, wherein the previous state of the blockchain data structure is accessible to the target device by way of all or part of the blockchain data structure being accessible to the target device.

10. The method of claim 8, wherein the previous state of the blockchain data structure is previously received and stored by the target device.

11. A computer system comprising:

a processor and memory storing computer program code for implementing code distribution to a target device for execution by the target device, the distribution being made by a base station to the target device via a network with one or more distribution servers arranged between the base station and the target device on the network, the processor and the memory being configured to:

cause the base station to maintain a blockchain data structure storing one or more blocks and having a state determined by a most recently committed block in the blockchain data structure;

cause the base station to generate a new transaction for storage in the blockchain data structure corresponding to code for distribution by the base station to a defined list of network connected devices including the target device, the new transaction including a hash value for the code and the defined list of network connected devices, wherein the new transaction is stored and committed as a new block in the blockchain data structure such that the blockchain data structure has a new current state, the new block having associated a hash value based on contents of the new transaction and a hash value evaluated for a block corresponding to a preceding state in the blockchain data structure;

cause the code, the defined list of network connected devices, and the hash value for the code and the defined list of network connected devices to be sent to the target device via the one or more distribution servers; and cause broadcasting of the new current state of the blockchain data structure for receipt by target device such that the target device is able to verify the code and a suitability of the code for execution by the target device.

12. A non-transitory computer-readable storage medium storing a computer program element comprising computer program code to, when loaded into a computer system and executed thereon, cause the computer to perform the method as claimed in claim 1.

* * * * *